Nov. 18, 1958  K. H. KARLSSON  2,860,540
CONTINUOUS BEARING RETAINER RING ADAPTED
FOR RADIAL EXPANSION
Filed March 20, 1957
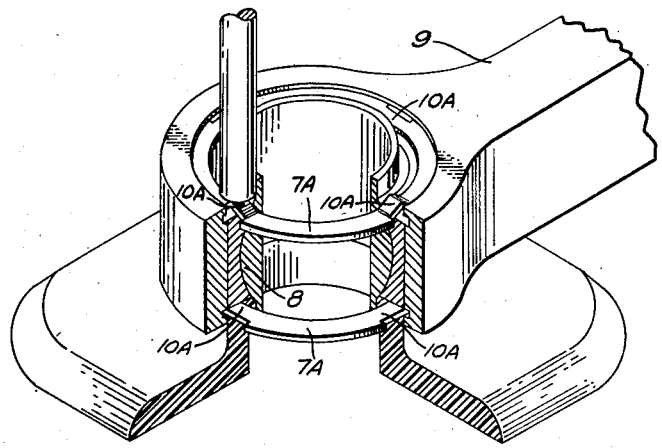
FIG. 1.
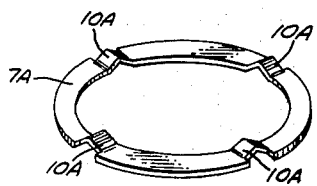   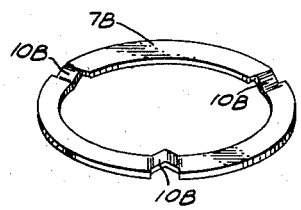   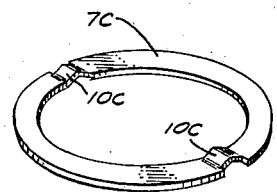
FIG. 2.        FIG. 3.        FIG. 4.
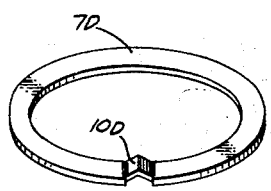   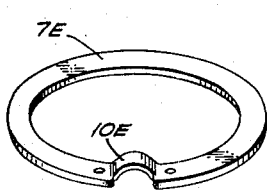
FIG. 5.        FIG. 6.
INVENTOR.
KARL H. KARLSSON
BY R. W. Hodgson

United States Patent Office 2,860,540
Patented Nov. 18, 1958

2,860,540

CONTINUOUS BEARING RETAINER RING ADAPTED FOR RADIAL EXPANSION

Karl H. Karlsson, Studio City, Calif., assignor of one-tenth to Gadget-Of-The-Month Club, Inc., Los Angeles, Calif., a corporation of California Application March 20, 1957, Serial No. 647,233

2 Claims. (Cl. 85—8.6)

Generally speaking, the present invention relates to the bearing retaining art and, more particularly, relates to an improved bearing retainer ring cooperable for retaining a bearing in the proper position.

Applicant is aware of the fact that prior art bearing retainers have been developed heretofore and that such prior art bearing retainers are disadvantageous for innumerable reasons. The most disadvantageous feature of the prior art bearing retaining arrangements is the inherent tendency of these devices to creep up and dislodge themselves from the bearing to be held in place thereby causing failure of the mechanism to which it is associated with. This failure is very prevalent, particularly in the aircraft industry where these bearings and associated mechanisms are subject to severe shock and vibration applications. Because of this drawback in the prior art bearing retaining devices there is considerable time wasted in checking the bearings to see that they are in proper position. Another important disadvantage feature of the prior art bearing retaining arrangements is the frequent breakdowns and maintenance problems which arise due to the dislodging of the prior art retaining devices from the bearing, which directly results in faulty performance with respect to the mechanism to which the bearing is generally associated with. The prior art bearing retaining arrangements do not take side loads too well and tend to break down or become dislodged after repeated or severe side loads.

The present invention was developed primarily to overcome the aforementioned problems and can be said to be a bearing retainer ring which is cooperable for press fitting with respect to a bearing. It may consist, generally speaking, of a continuous, annular bearing retainer ring cooperable for retaining a bearing in the proper position and has a retaining position and a non-retaining position and also has at least one crimp thereon. These crimps may be substantially semicircular, but are usually V-shaped and are symmetrically disposed around the circumference of the bearing retainer ring. The crimps have a locking and non-locking position and are cooperable for expansion from the V-shaped or semicircular, non-locking position, into a virtually horizontal, locking position with respect to the bearing retainer ring thereby actuating the bearing retainer ring into the aforementioned retaining position. The crimps are generally press fitted into the locking position by the use of standard type tools which are available.

From the above description of basic and generic forms of the present invention, it will be apparent to those skilled in the art that virtually all of the hereinbefore mentioned prior art problems and/or disadvantages are substantially entirely eliminated, met and/or overcome in and through use of the present invention.

For example, it is obvious that the bearing retainer ring of the present invention is rapidly and easily installable, and that, when mounted with respect to a bearing, it is very firmly positioned in a manner which virtually completely eliminates the likelihood of the bearing becoming accidentally disengaged from the mechanism to which the bearing is associated with.

With the above points in mind, it is an object of the present invention to provide a bearing retainer ring which retains a bearing under the most severe shock and vibration conditions.

It is a further object of the present invention to provide a bearing retainer ring which includes crimp locking means of greatly improved characteristics.

It is a still further object of the present invention to provide a bearing retainer ring of the character set forth in the preceding objects, which is extremely inexpensive, simple, easy to install and of virtually foolproof construction and operation.

Other and allied objects will be apparent to those skilled in the art after a careful perusal, examination and study of the accompanying illustrations, the present specification, and the appended claims.

To facilitate understanding, reference should be made to the hereinbelow described figures, in which:

Fig. 1 is an operational perspective view, partly broken away, one bearing retainer ring completely press fitted into retaining position and a second bearing retainer ring partly press fitted into retaining position with respect to a bearing and associated mechanism;

Fig. 2 is a perspective view of one illustrative embodiment of the present invention;

Fig. 3 is a perspective view of another illustrative embodiment of the present invention;

Fig. 4 is a perspective view of a further illustrative embodiment of the present invention;

Fig. 5 is a perspective view of a still further illustrative embodiment of the present invention; and Fig. 6 is a perspective view of still another illustrative embodiment of the present invention and which features a semicircular crimp.

Generally speaking, the bearing retainer ring, indicated generally at 7, with a different alphabetical designation, however, to distinguish between the various modifications, has a retaining and non-retaining position and is cooperable for press fitting with respect to a bearing 8, as illustrated in Fig. 1, so as to retain the bearing 8 within the link 9.

The bearing retainer ring 7 is continuous and annular, as shown in Figs. 1–6, and has at least one crimp thereon, indicated at 10 with an alphabetical designation corresponding to the particular modified version, which has a locking and non-locking position and which is cooperable for expansion from the non-locking position, as best shown in Figs. 2–6, into a virtually horizontal, locking position, as partly shown in Fig. 1, with respect to the bearing retainer ring 7. When the crimps 10 are forcibly expanded into the virtually horizontal, locking position the bearing retainer ring 7 is actuated from the non-retaining position, as illustrated in Figs. 2–6, into the retaining position, as illustrated by the bottom retainer ring 7A and partly by the top retainer ring 7A in Fig. 1, thereby maintaining the bearing 8 in the proper position with respect to the mechanism 9.

Figs. 1 and 2 illustrate a bearing retainer ring 7A which has four downwardly directed V-shaped crimps 10A thereon.

Fig. 3 illustrates a bearing retainer ring 7B which has only three downwardly directed V-shaped crimps 10B thereon which are symmetrically disposed therearound.

Fig. 4 shows a bearing retainer ring 7C which has two downwardly directed V-shaped crimps 10C thereon and Fig. 5 shows a bearing retainer ring 7D having only one downwardly directed V-shaped crimp thereon.

Fig. 6 shows a bearing retainer ring 7E which has only one semicircular crimp 10E thereon which works in substantially the same manner as the V-shaped crimps 10.

It should be understood that the bearing retainer ring, although normally made from metal, is not necessarily so limited and other suitable materials such as plastic or the like may be used.

Numerous modifications and variations of the present invention will occur to those skilled in the art after a careful study hereof. All such properly within the basic spirit, scope and/or teachings of the present invention are intended to be included and comprehended herein as fully as if specifically described, illustrated and claimed.

For example, it is obvious that the crimps of the present invention may assume a variety of different locations (and/or number) other than as specifically described and illustrated herein. Also the crimps are not necessarily limited to V-shaped or semicircular configurations.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A continuous annular retainer ring substantially flat in a radial direction and adapted to be forcibly radially outwardly expanded into a radially inwardly open circular groove in the inner surface of a wall defining a cylindrical recess, said flat annular retainer ring having at least one deformable crimp extending out of the plane of said flat annular retainer ring and in a direction substantially at right angles with respect thereto, said crimp being radially inwardly reduced with respect to circumferentially adjacent portions of said flat annular ring on each side of said crimp and defining clearance means cooperable to allow said crimp to be deformed into the same flat horizontal plane as the remainder of the flat annular ring, thereby expanding said ring into a radially inwardly open circular groove in the inner surface of a wall defining a cylindrical recess.

2. A continuous annular bearing retainer ring substantially flat in a radial direction and adapted to be forcibly radially outwardly expanded into a radially inwardly open circular groove in the inner surface of a wall defining a cylindrical recess and immediately adjacent a bearing carried in said cylindrical recess for retaining said bearing therein, said flat annular retainer ring having a plurality of deformable crimps, each of a substantially inverted V-shape and each extending out of the plane of said flat annular retainer ring and substantially perpendicular to said plane, each of said crimps being radially inwardly reduced with respect to circumferentially adjacent portions of said flat annular ring on each side of said crimp and defining clearance means cooperable to allow each of said crimps to be deformed into the same flat horizontal plane as the remainder of the flat annular ring, thereby expanding said ring into a radially inwardly open circular groove in the inner surface of a wall defining a cylindrical recess.

References Cited in the file of this patent

UNITED STATES PATENTS

| | | |
|---|---|---|
| 786,957 | Crane | Apr. 11, 1905 |
| 1,694,354 | Rollason | Dec. 4, 1928 |
| 2,786,423 | Coffey | Mar. 26, 1957 |